US008027456B1

(12) United States Patent
Zhang et al.

(10) Patent No.: US 8,027,456 B1
(45) Date of Patent: Sep. 27, 2011

(54) METHOD AND SYSTEM FOR PROVIDING CALL TONES SERVICE IN A SYSTEM WITH MULTIPLE MEDIA CONTENT PROVIDERS

(75) Inventors: Baoquan Zhang, Overland Park, KS (US); Charles E. Woodson, Peculiar, MO (US); Geoff S. Martin, Overland Park, KS (US); Jay S. Harmon, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1370 days.

(21) Appl. No.: 11/586,165

(22) Filed: Oct. 24, 2006

(51) Int. Cl.
*H04M 3/00* (2006.01)
*H04M 3/42* (2006.01)
*H04M 7/00* (2006.01)

(52) U.S. Cl. .............. 379/257; 379/201.01; 379/221.11; 455/414.1

(58) Field of Classification Search ............. 379/201.01, 379/207.16, 221.08, 221.09, 221.11, 257, 379/373.01, 373.02, 374.01; 455/414.1
See application file for complete search history.

(56) References Cited

U.S. PATENT DOCUMENTS

| | | | |
|---|---|---|---|
| 6,731,738 B1 | 5/2004 | Qui et al. ...................... 379/219 |
| 7,340,049 B2 * | 3/2008 | Batni et al. ............... 379/221.08 |
| 7,400,882 B2 * | 7/2008 | Hahm et al. ................ 455/414.1 |
| 7,512,421 B2 * | 3/2009 | Kim et al. ...................... 455/567 |
| 7,613,287 B1 * | 11/2009 | Stifelman et al. ......... 379/215.01 |
| 7,839,995 B2 * | 11/2010 | Batni et al. ...................... 379/418 |
| 7,844,044 B2 * | 11/2010 | Batni et al. ...................... 379/257 |
| 2004/0114732 A1 | 6/2004 | Choe et al. .................. 379/88.17 |
| 2004/0120494 A1 * | 6/2004 | Jiang et al. ............... 379/210.01 |
| 2005/0105706 A1 | 5/2005 | Kokkinen ................ 379/201.01 |
| 2006/0098801 A1 | 5/2006 | Hahm et al. .................... 379/257 |
| 2006/0109970 A1 | 5/2006 | Shim et al. ............... 379/207.16 |
| 2006/0135158 A1 | 6/2006 | Lee et al. .................... 455/435.1 |
| 2006/0203985 A1 * | 9/2006 | Beauford ................. 379/211.01 |
| 2007/0003046 A1 * | 1/2007 | Batni et al. ............... 379/215.01 |
| 2007/0003047 A1 * | 1/2007 | Batni et al. ............... 379/215.01 |
| 2007/0071218 A1 * | 3/2007 | Zhang ....................... 379/221.09 |

* cited by examiner

*Primary Examiner* — Harry Hong

(57) ABSTRACT

A carrier providing wireless services provides ringback media such as call tones via one or more call tones content providers. In one aspect, a service entity (e.g., SCP or application server) is provisioned with data unique to ringback media service subscribed to by the subscriber. The service entity provides routing instructions to a mobile switching center identifying a ringback media server (e.g., content provider platform) to render ringback media to the caller. In another aspect, a caller can exercise control over the play of ringback media, e.g., by inputting DTMF tones, which responsively cause a ringback media server to change the play of ringback media, e.g., stop it or play a different selection. In another aspect, when a subscriber initiates a call to called party that subscribes to a competitor carrier, the carrier limits exposure of the subscriber to the ringback media of the competitor carrier. In one possible configuration, the carrier inserts its own ringback media.

14 Claims, 8 Drawing Sheets

METHOD AND SYSTEM FOR PROVIDING CALL TONES SERVICE IN A SYSTEM WITH MULTIPLE MEDIA CONTENT PROVIDERS

CROSS-REFERENCE TO RELATED APPLICATION

This application is related to the application of Baoquan Zhang et al., "Method and System to Facilitate Multiple Media Content Providers to Inter-Work with Media Serving System", Ser. No. 11/501,284 filed Aug. 8, 2006, the content of which is incorporated by reference herein.

BACKGROUND

A. Field

The invention relates to providing "ringback" media, e.g., tones, music, speech or other media, to a caller's phone. Ringback is the ringing or other sound that a caller hears while waiting for the called party to answer the phone. In one aspect, the invention relates to systems and methods for providing ringback media service for callers in a system with multiple ringback content providers. In another aspect, the invention relates to a method of dynamically controlling ringback media content played to a caller, either by the caller or by the caller's carrier.

B. Related art

In traditional phone systems, a switch in telephone network plays a ringback tone in the form of call tones to the calling party. The switch may be at the caller's end of the call or at the called party's end of the call. The provision of call tones to a calling party is sometimes referred to in the art as "call tones service."

In this respect, call tones service is different from some other services, such as customized ringers, screensavers, games and applications etc. In these other types of services, the end device (typically a mobile device which includes telephone functionality) downloads a specific type of media/information, and then runs it from the end device. For example, for ringers, the mobile device downloads the particular ringer media from a network based server, and then the user can use the ringer by assigning it to callers or call types.

Call tones service, as noted above, is usually network-based. That is, call tones media is played from a network device (typically, a call tones server) not the end device. The call tones are packetized from a call tones server and transmitted over a communications network to the end device calling party. (Call tones are packetized if Voice over Internet Protocol (VoIP) technology is involved. Currently most call tones systems are TDM-based. In a non-VoIP scenario, the call tones would be transmitted the same way as traditional TDM voice signals). In some instances, the call tones server is operated by the third party provider of the call tones content. Regardless of whether the call tones server is operated by a wireless service provider or a third party content provider, downloading of call tones to the end device is unnecessary. However, it does introduce some special complexities. Such complexities can be due to the fact that call tones media may be provided by multiple independent call tones content providers. In other words, the source of the call tones may be a third party which is independent from the carrier providing telephone services (e.g., Sprint Nextel). There is a need for the call tones system (i.e., the telecommunication system providing call tones to end devices) to inter-work with multiple content providers that sell the call tones content.

In a current method of operation, the call tones systems usually have a content management interface from where call tones contents are either manually or automatically provisioned. The call tones are supplied by a particular content provider that has contracted with the call tones service provider. Alternatively, the call tones service provider may choose to perform the content management function itself. Under this method, the call tones users usually access a call tones catalog and make purchases of call tones content via an interactive interfaces provided by the call tones system. Such interface may take the form of a web interface, interactive voice response unit (IVR), or via short message service (SMS) or wireless application protocol (WAP) messaging.

The current approaches have several limitations. In the first scenario of a contracted call tones content provider, the call tones contents are statically provisioned by the content providers. In the second scenario, where the call tones system provides a catalog, the call tones users are restricted to access the call tones catalog and make purchases from the web/WAP/IVR/SMS interfaces provided by the service provider. The limitations restrict the call tones users to the available contents set by the service provider, and limit call tones browsing and purchasing to be in the service provider's domain.

SUMMARY

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements.

It will also be noted that the disclosed inventions can be implemented in a variety of telecommunications architectures and the invention is not architecture-specific. For example, they can be implemented in conventional cellular telephone systems, as well as in Voice over IP, Voice over WiFi, and Voice over WiMax systems. In these three later systems, a voice network includes an application server which provides call processing intelligence, such as switching and digit analysis, and in such a system a mobile switching center (such as found in conventional cellular communications systems) may not be used. Furthermore, many of the functions performed by the various entities can be provided in software, hardware, or in a combination thereof. Thus, in the following summary and detailed description, the particular details of the disclosed embodiments are offered by way of illustration and not limitation.

In a first aspect, a method is disclosed which provides a way of routing an incoming call for a call tones subscriber to a ringback media content server. The method is useful when the service provider (carrier) network supports multiple call tones solutions/service provider platforms. The method provides a way of efficiently routing calls to particular content providers to render ringback content for a diverse population of subscribers.

The method provides for routing an incoming call to a ringback media server, e.g., content server of a provider of ringback media, for example call tones. The method includes the steps of provisioning a service entity (e.g., service control point (SCP) of an AIN or SS7 network) with data which is unique to the ringback media service subscribed to by the subscriber. A mobile switching center handling ringback service for the call queries the service entity for routing instructions for ringback media to play for the caller. The service entity provides routing instructions to the mobile switching center. The routing instructions identify a ringback media server to render ringback media to the caller.

In one embodiment, the routing instructions identify a call tones provider platform. For example, the service entity could be provisioned with data which indicates that a particular subscriber is assigned to a particular call tones service provider ("provider A"), and that all call tones for that subscriber are to be handled by the provider A platform. Other subscribers could be assigned to other providers, e.g., providers B and C.

In another possible implementation, the service entity dynamically determines the routing instructions (e.g., identity of service provider platform) at the time of the incoming call. For example, the routing instructions could be determined based on at least one of:

a) the time of day (e.g., provider X handling calls between 10 pm and 6 am and provider Y handling calls between 6 am and 8 am, etc.), b) the day of the week, c) the content of ringback media purchased by the subscriber; and d) the calling party telephone number.

When the service entity determines the correct routing information (e.g., network address, 1-800 telephone number, or other routing information, in whatever form), the service entity forwards that routing information to a mobile switching center (or other switching element) responsible for connecting the caller to the ringback media platform for rendering media content.

In another aspect of this invention, a method is disclosed of controlling the play or rendering of ringback media content to a caller. Two different ways are contemplated for controlling content, one of which involves the caller controlling the play and another which involves the caller's carrier controlling the play.

In the example of the caller controlling play of ringback media content, the method includes the steps of establishing a connection between a ringback media server and a telephone used by the caller; transmitting ringback media to the telephone during a ringback period; receiving signals from the telephone (e.g., DTMF tones) at the ringback media server during the ringback period; and then changing the ringback media transmitted from the ringback media server to the telephone responsive to the received signals. For example, the caller may be prompted to press certain digits on the telephone key pad in order to pause, stop, fast forward or rewind the content (it will be noted that such action is considered "changing" the ringback content because the transmission of the content is affected from what it otherwise would be if no digits were pressed. When the digits are pressed DTMF tones are sent from the telephone to the ringback media server which interprets the signals and responsively pauses, stops, fast forwards, or rewinds the ringback media content. As another example, the caller could press some particular digit pattern, e.g., # 2, which would cause the ringback media server to transmit a standard ringing tone until the called party goes off-hook.

In still another aspect, an improvement to a ringback media server is disclosed having a processing unit and a memory storing program instructions for execution by the processing unit. The ringback media server transmits ringback media to callers served by a carrier providing wireless services for the callers. The improvement comprising providing program instructions in the memory, including instructions (e.g., module or routine) a) to process signals (e.g., DTMF tones) from telephones used by callers received at the ringback media server during a period of time in which ringback media is being transmitted by the ringback media server to the telephones, and instructions (e.g., module or routine) b) to change the ringback media transmitted from the ringback media server to the telephones responsive to the received signals.

A further aspect of this disclosure relates to a method of a carrier controlling the play of ringback media to a caller which is a subscriber to a carrier. In this aspect, the idea is that the carrier may want to limit is subscribers' exposure to ringback tones offered by competing carrier, perhaps in order to not lose the subscriber to the other carrier, and so the carrier may substitute its own ringback tones for that offered by the competing carrier or otherwise stop, interrupt or prevent play of ringback media of the competing carrier.

In this respect, the method comprises the steps of a) determining whether the caller calls a party that (1) subscribes to a second carrier and (2) subscribes to a ringback media service with the second carrier; and b) limiting exposure of the caller to ringback media provided by the second carrier. As noted, the step b) may include the step of transmitting ringback media tones offered by the carrier to the caller. For example, the carrier may determine a genre, style (or more generally, "category") of ringback tones that would be been provided by the second carrier, and then selects a ringback tone which falls within the category and plays that tone for the caller. For example, call tones may be associated with a particular identification (e.g., ID number) and a look up table consulted which correlates call tone ID numbers to genres or types. A carrier may determine (1) that a particular call tone is of a particular genre, (2) that it does not support or offer that call tone, but it supports or offers another call tone of that genre, and then (3) it directs is call tones server to play the call tone of that genre that it supports. Alternatively, if it determines that the caller would be exposed to a call tone that it does not offer or support, it could play a standard call in progress tone to the caller phone. Again, these are but a few examples of how this invention could be implemented.

These and still other aspects of the invention will be more fully explained in the following detailed description and with reference to the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF PREFERRED EMBODIMENTS

FIGS. 1-6 will be described first, which relate to a system and methods for multiple call tones or other media service providers to interwork with a call tones platform. The thrust of FIGS. 1-6 and the first part of the following disclosure is integration of the multiple content providers, particularly during the process of purchasing call tones content. The aspects of the disclosure relating to playing of call tones during a call, including caller or carrier control over call tones playing, will be addressed later in this document, in context of FIGS. 7-8. It will be understood that details from the following discussion of FIGS. 1-6 are not necessarily required for the implementation of the aspects of the invention relating to rendering and control of call tones. Rather, they are offered by way of further background and context of one possible telecommunications system which includes both features for users to purchase call tones content from one or more content providers, and also features for rendering the call tones content later on.

Figure 1:
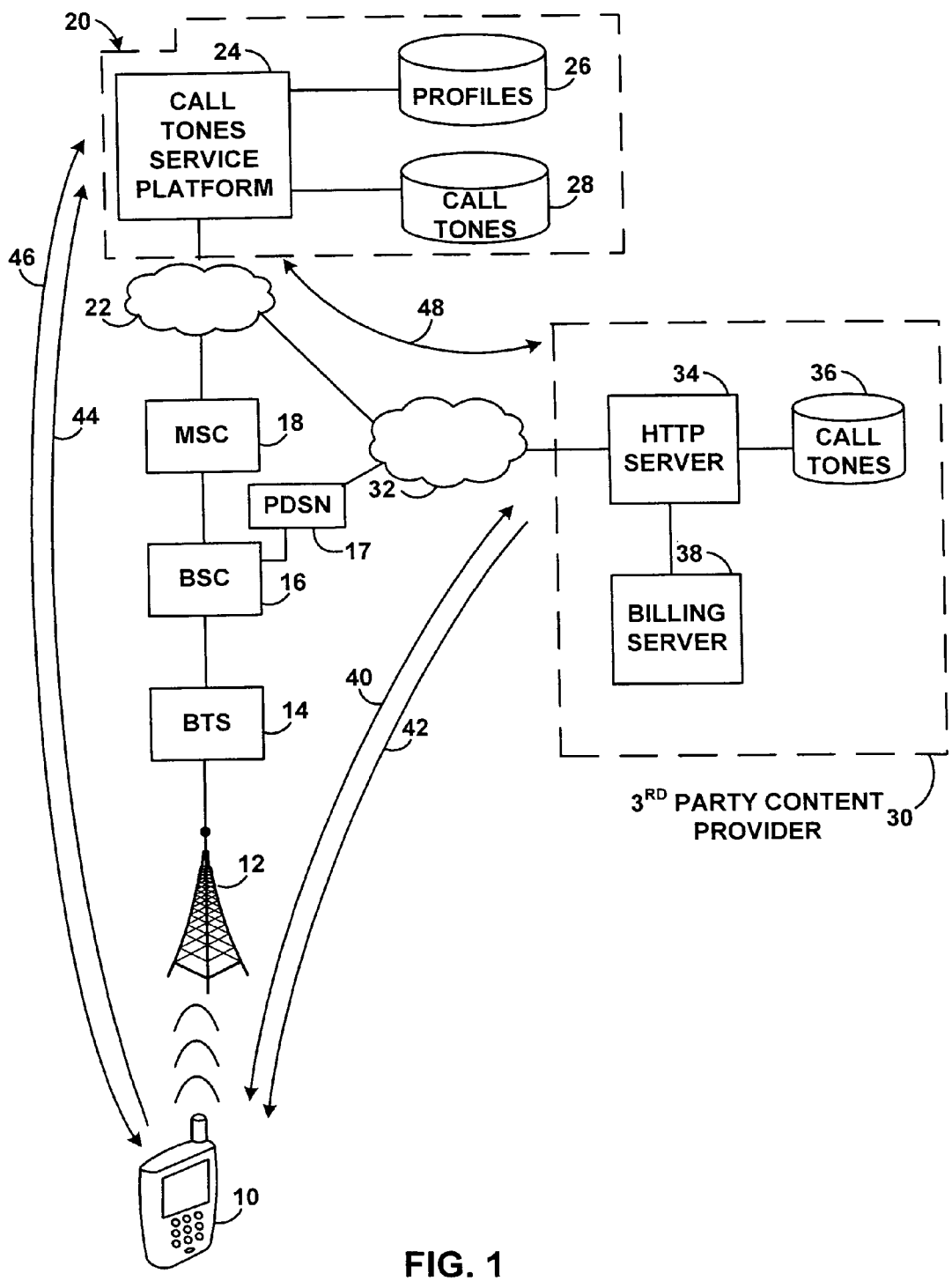
FIG. 1 is a block diagram of a system facilitating multiple call tone content providers to inter-work with a call tones system, with the arrows showing message flows that occur when a user operating a mobile device purchases call tones content from a third party call tone provider.

FIG. 1 is a block diagram of a system facilitating a call tone content provider 30 to inter-work with a call tones system 20. The basic idea of FIG. 1 is to provide a mechanism for a user of a telephone 10 to purchase a call tone from a content provider 30 and provide a convenient method for have the call tones system 20 to update a profile for the user of the phone 10 to include the newly-purchased content. The system and method of FIG. 1 allows the call tones system 20 to readily extend to include different call tones which may be offered by third party content providers 30, and to keep the user profile current when new content is purchased.

Figure 2:
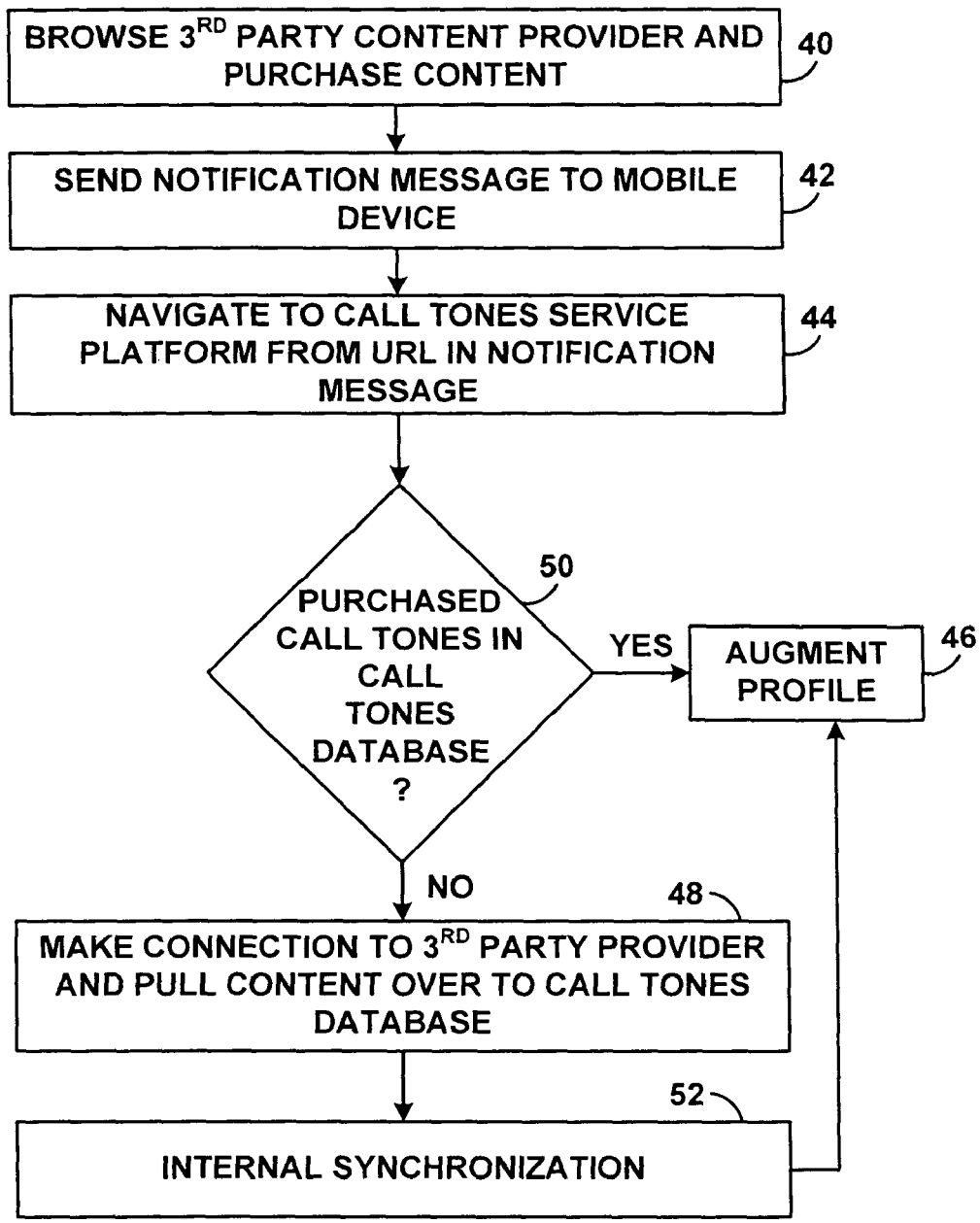
FIG. 2 is a flow chart showing the messaging flow of FIG. 1 in greater detail.

Only one call tones content provider 30 is shown in FIG. 1, it being understood that the principles of operation shown and explained in FIGS. 1 and 2 and can be applied to other content providers. The arrows 40, 42, 44, 46 and 48 in FIG. 1 show message flows that occur when a user operating a mobile device 10 purchases call tones content from a third party call tone provider 30. The explanation of the message flows 40, 42, 44, 46 and 48 are further explained in FIG. 2.

While the following discussion is in the context of call tones, the system of FIG. 1 can be extended to purchases of other types of media content from third party providers, such as games, voice mail messages, etc. This aspect will be described subsequently in conjunction with FIG. 5.

The telephone 10 may take the form of a cellular telephone, personal digital assistant, palm computer, land line phone, Voice over IP phone, or any other kind of terminal or other equivalent device with telephone functionality. The present discussion will refer to the phone 10 as one which is used by a subscriber of wireless telephone services, such services provided by a wireless service provider which manages the call tones system 20. The illustrated phone 10 therefore includes an antenna and processing circuitry for engaging in RF communications with a wireless network infrastructure having an antenna 12, base transceiver station 14, base station controller 16 and a mobile switching center 18. These details are conventional and known in the art, e.g., in wireless networks compliant to the IS-41 standards. The MSC 18 is connected to a wireless service provider network 22, which may take the form of a wide area packet-switched network. The network infrastructure may also include a packet data serving node (PDSN) 17 which provides connectivity from the wireless device 10 to a packet switched network such as the Internet 32.

The call tones system 20 includes a call tones service platform 24, a profiles database 26 and a call tones database 28. The call tones service platform 24 may take the form of a general purpose computing platform which is connected to the network 22. It is programmed with instructions for communicating with the device 10 as described herein to update a call tones profile for the user in the profiles database 26. The profiles database 26 is a database which stores information associating call tones with particular callers. The call tones database 28 is a database containing call tones media files. In an alternative configuration, the database 28 stores information identifying particular call tones (such as ID numbers or names for them), but does not store the actual media files. In the event that the user of the device 10 purchases a call tone that is not currently stored in the database 28, the call tones service platform obtains the call tone media file directly from the third party content provider 30.

The service provider network 22 is coupled via one or more intermediate networks 32 to the third party content provider 30. The network 32 may be the Internet, for example. The third party content providers have a presence on the Internet, by means of an HTTP web server 34 which serves web pages describing call tones content available for purchase. The content provider 30 may include a call tones database 36 storing content media files. The provider 30 may also include a billing server 38 for storing purchase transaction information. Such purchase transaction information may be furnished to a billing server (not shown) of the wireless service provider for purposes of billing content that is purchased. The call tones content provider may also support other forms of access to their content, such as by interactive voice response (IVR) systems.

The operation of the system of FIG. 1 provides a method of integrating a call tones content provider 30 with a call tones service provider, in this example a wireless service provider operating the call tones system 20. The method will be discussed in conjunction with the arrows 40, 42, 44, 46 and 48 of FIG. 1 and the flow chart of FIG. 2.

As indicated by the arrows 40, the user of the device 10 launches the web browser on the device, acquires Web connectivity using the wireless network infrastructure 12, 14, 16, PDSN 17 and network 32 and navigates to the home page of the call tones content provider 30. The arrows 40 indicate the exchange of web page requests and responsive content by which the device 10 accesses and purchased content from the third party provider 30. The manner in which the call tones content is browsed and purchased is not particularly important. The purchase transaction is logged by the billing server 38 and reports of call tones content purchases are furnished to the wireless service provider, e.g., to the profiles database 26 or to a separate billing system managed by the wireless service provider. Alternatively, such billing could be by credit card, by deduction in value from a calling card, or by any other means.

Figure 4:
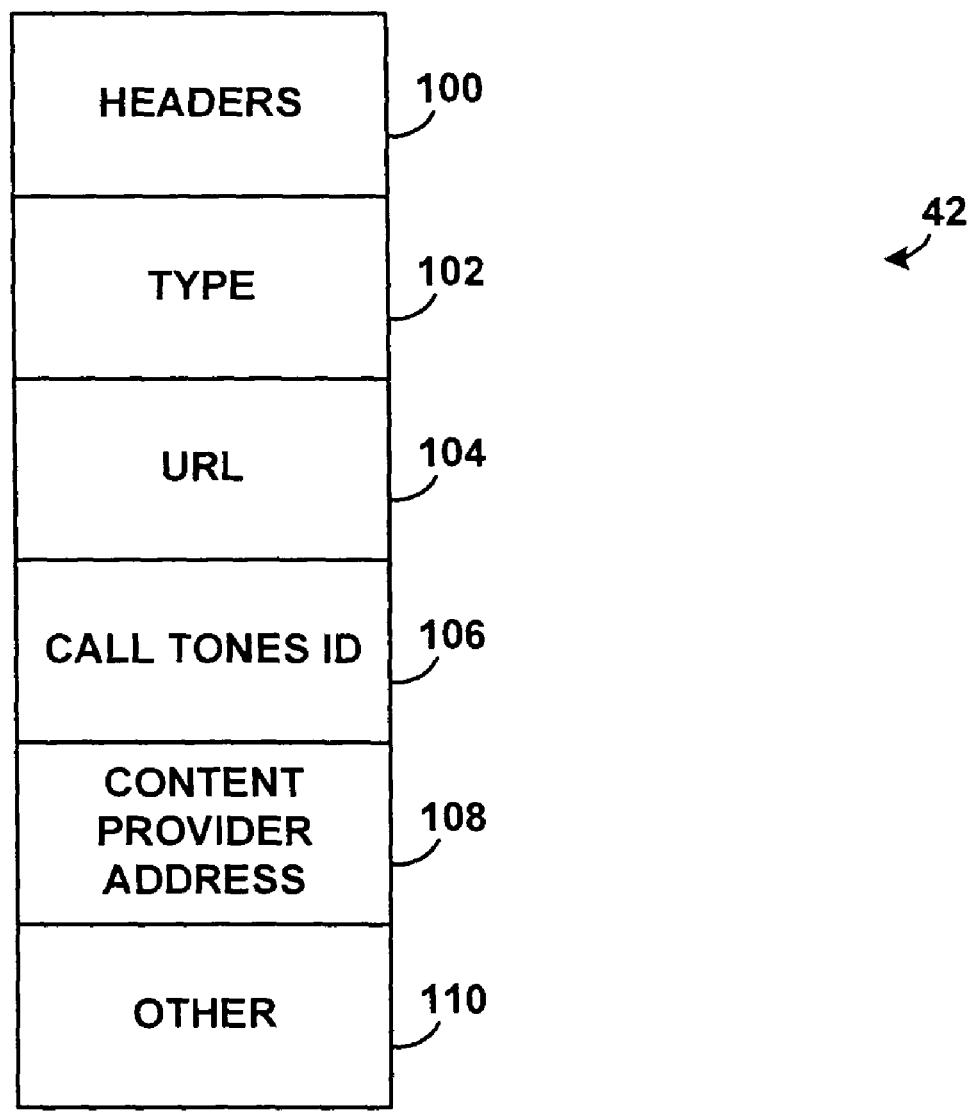
FIG. 4 is a block diagram of an example of the notification message of FIGS. 1 and 2.

As indicated by arrow 42, a notification message is sent from the content provider system 30 (e.g., by web server 34) to the device 10. The notification message is triggered by the completion of a purchase transaction. One example of a notification message 42 is shown in FIG. 4 and will be described subsequently. The notification message is preferably in electronic form, and may take the form of a Short Message Service (SMS) or Multimedia Message Service (MMS) message, email, or other form. The format of the message 42 is not particularly important, and can vary widely. The notification message 42 preferably includes several different elements. First of all, the notification message includes a network address, e.g., Uniform Resource Locator (URL) of the call tones service platform 24. The URL, which may be presented on the device 10 as a link on the device 10 user interface, facilitates the subscriber accessing the service platform 24 for the purpose of updating the user profile 26 with the new content, for example by clicking on the link. The message 40 also preferably includes an identification of the purchased content, such an ID number, name, etc. of the content. This identification is provided to the platform 24 when the device 10 connects to the platform 24, e.g., as an action that occurs automatically after the phone has established a connection to the platform 24. The notification message 42 also preferably includes information identifying the media content provider, either directly or indirectly. An example of a direct identification of the content provider is inclusion of the content provider name in the message 42. An example of indirect identification of the content provider is inclusion of a unique network address (e.g., URL) of the content provider.

After the notification message 42 is received by the phone 10, the phone's browser (or other application) opens the message, and displays the URL of the call tones service platform 24 which was included in the message 42. As indicated by step 44 in the flow chart of FIG. 2, the user navigates to the call tones service platform by clicking or selecting the displayed URL. When the user navigates to the call tones service platform, the identity of the purchased call tone is provided to the call tones service platform 24.

At step 50 in FIG. 2, the platform 24 determines whether the call tones that were purchased are in the call tones database 28. If so, the process proceeds to step 48 wherein the user profile 26 is updated to indicate the assignment of the call tones to particular calling numbers in response to instructions and information received from the phone 10. The exchange of query and responses to indicate how the call tones are to be provisioned are also indicated by the arrow 46 in FIG. 1.

If, at step 50, the call tones are not in the database 28, the call tones service platform 24 makes a connection to the third party content provider 30 and pulls the content over to the call tones database 28, as indicated by the arrows 48 in FIG. 1 and step 48 in FIG. 2. Recall that the identity of the call tones provider 30, e.g., its network address, was supplied to the phone 10 in the notification message 42. The identification is further provided to the call tones service platform 24 when the user of the phone 10 navigates to the platform 24 in step 44. Thus, the platform 24 is supplied with an address by which it may connect to the call tones service platform and request transmission of the call tones file. The call tones media file obtained by the provider 30 (e.g., from call tones database 36) is stored in the call tones database 28.

In one optional embodiment, the service platform includes a facility for performing a screening function for purchased call tones. The facility for screening is basically a mechanism for determining whether the call tone content contains objectionable matter (e.g., profanity). The call tones service provider may conduct such screening automatically, e.g., by using speech recognition algorithms to look for speech patterns in the call tones. As another example, the platform 24 may include a graphical user interface and speakers which allows a human operator to screen call tones. The service provider system 20 has an interest in preventing objectionable call tones from being played on its system. In either case, the final authorization of the call tones purchase from the third party content provider site would typically be after the screening process is completed successfully, i.e., the call tones service provider system 20 has allowed the purchase. Alternatively, the call tones service provider system 20 screens all the third party offered content before it is offered on the content provider website, e.g., pursuant to an appropriate provision in a service level agreement (SLA) between the service provider and the third party content provider.

At step 52, an internal synchronization takes place between the call tones database 28 and remotely located run-time sites where call tones are played during calls. Recall that call tones service platform 24 is essentially a "back end" centralized data center system and associated profile and call tones databases, and during a call the call tones can be served from separate run time sites (see FIG. 6, run time sites 70 and attached call tones database 28A). The service platform 24 can be considered as backend for billing, provisioning, content management and customer Web/WAP access purposes. The run time sites 70 are for real time call handing and tone play purposes. Thus, at step 52 in FIG. 2, there is a synchronization process where the call tones data at the call tones service platform database 28 and the run time sites 70 database 28A are synchronized. As noted previously, the content fetching from the third party content providers is a function of the service platform 24. After this is done, synchronization would need to occur between data center system and the run time sites (i.e., an internal process), in order to make sure that the call tones are played to calling parties in accordance with the profile as soon as possible after the profile is updated in the database 26.

After synchronization occurs at step 52, the process proceeds to the augment profile step 46, wherein the user of the phone 10 provides instructions to the service platform 24 as to assignment of the call tones to calling parties.

Figure 3:
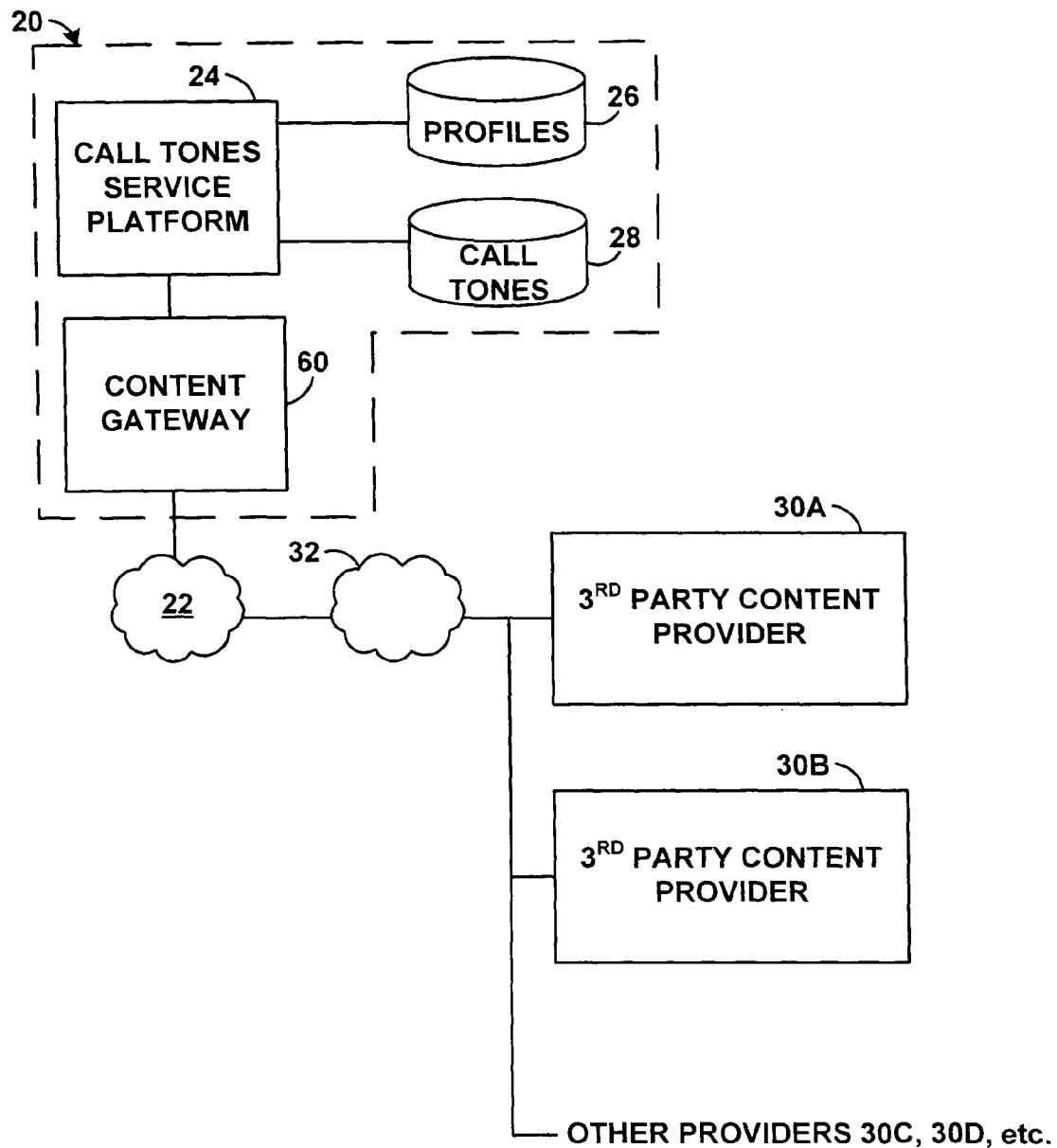
FIG. 3 is a variation on the embodiment of the system of FIG. 1, showing a contents gateway within the call tones system; communications from the call tones service platform to the third party providers proceeds through the contents gateway.

FIG. 3 shows a variation on the embodiment of FIG. 1. In FIG. 3, the call tones system 20 includes a content gateway 60. The content gateway may take the form of a router. Communication between the call tones service platform 24 and the call tones content providers is routed through the content gateway 60. FIG. 3 also shows multiple third party content providers 30A, 30 B, 30C etc. Each of these content providers has a presence on the Internet 32 and can be accessed by the call tones service platform 24 and content gateway 60 using HTTP, FTP, or other networking protocol.

FIG. 4 shows one possible example of a notification message 42 which is triggered for transmission by the third party content provider in response to a media purchase transaction. The message 42 includes a plurality of fields, including headers 100 such as source and destination addresses, the format which may vary depending on the protocol used. A type field 102 identifies the type of message and will be used by an application running on the phone 10 to handle the message according to the description in this document. The field 104 includes the network address (URL) of the call tones service platform 24. Field 106 includes an identification of the purchased call tones (or other media, e.g., ringer, voice mail message, etc.). Field 108 includes the address (URL) of the third party content provider. Optional field 110 is for other purposes, such as checksum, etc. The information in field 104 is displayed on the phone 10 to provide a link to the service platform 24, which the user may activate as indicated in step 44 to establish a connection to the service platform 24. When this connection is made, the information in the field 106 and the field 108 is forwarded automatically to the service platform 24 and used as described previously.

Applications for Other Types of Media Content Besides Call Tones

While the above example has been in the context of call tones, the principles and methods of FIGS. 1 and 2 are applicable to other types of media. Consider for example the system of FIG. 5. There may be multiple content providers of each type of media, such as for example ringers content providers 200A ... 200N, screen savers content providers 202A ... 202N, games providers 204A ... 204N, and other media providers 206, such as providers of call tones, celebrity voices, voice mail messages, or other media. The process of purchasing content from any of the content providers 200, 202, 204, 206 is the same as explained above in FIGS. 1 and 2. Each content provider provides a notification message to the phone 10 when the purchase transaction is completed. The user then clicks on the link contained in the notification message and navigates to a media service platform 24. The media service platform 24 determines whether the purchased media is present in the media database 28. If so, they provision the media in response to instructions received from the phone 10. If not, they obtain the content from the media content providers 200, 202, 204, 206. They then undergo an internal synchronization with real time run sites (not shown in FIG. 5, but present as shown in FIG. 6). The user profile database 26 is then updated in response to information from the phone.

Figure 5:
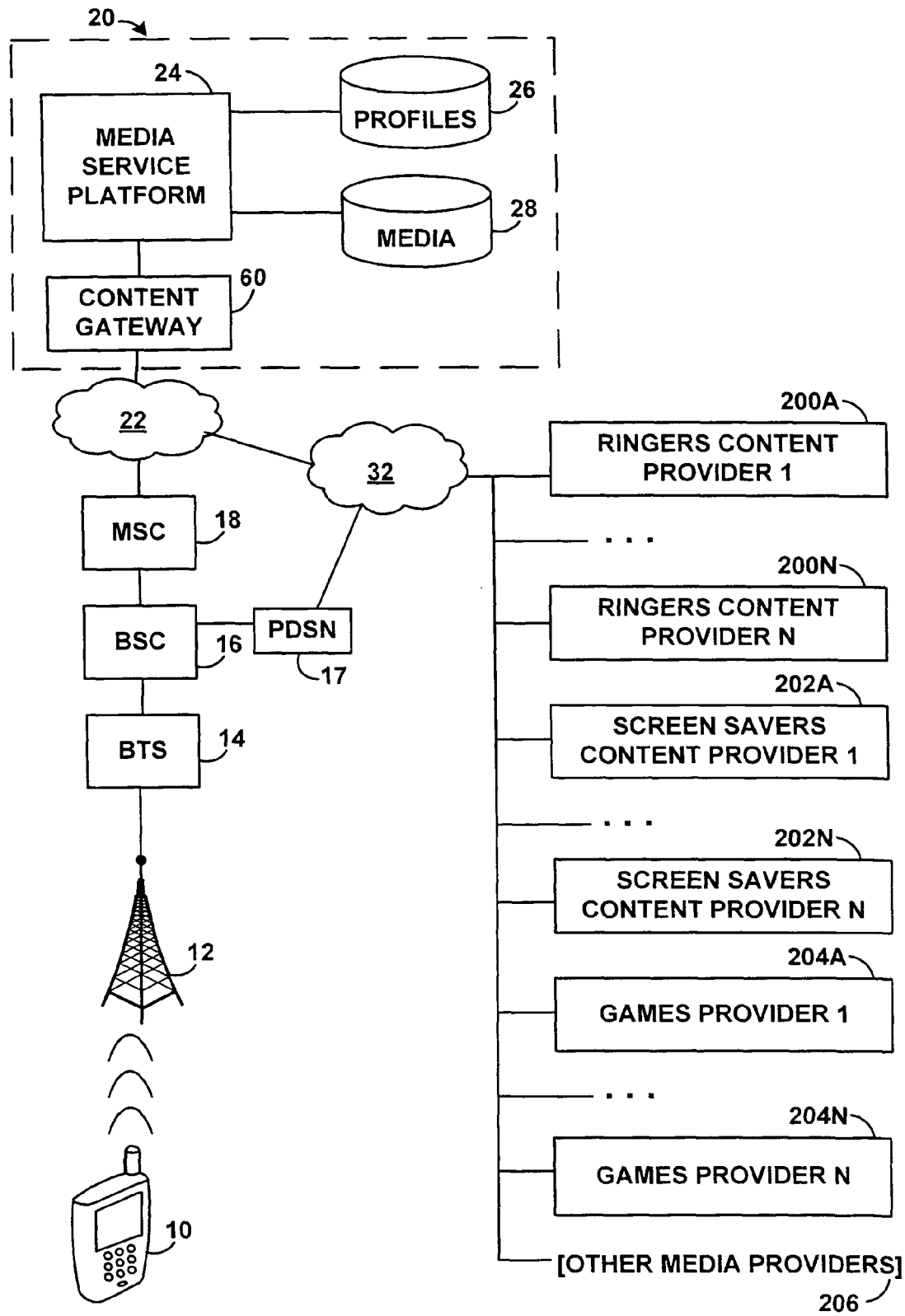
FIG. 5 is a block diagram of a system for facilitating multiple content providers to inter-work with a media service provider platform. The operation of the system of FIG. 5 may include the features of FIGS. 2 and 4, for different types of media, including ringers, games, screen savers, celebrity voices or other type of content.
Figure 6:
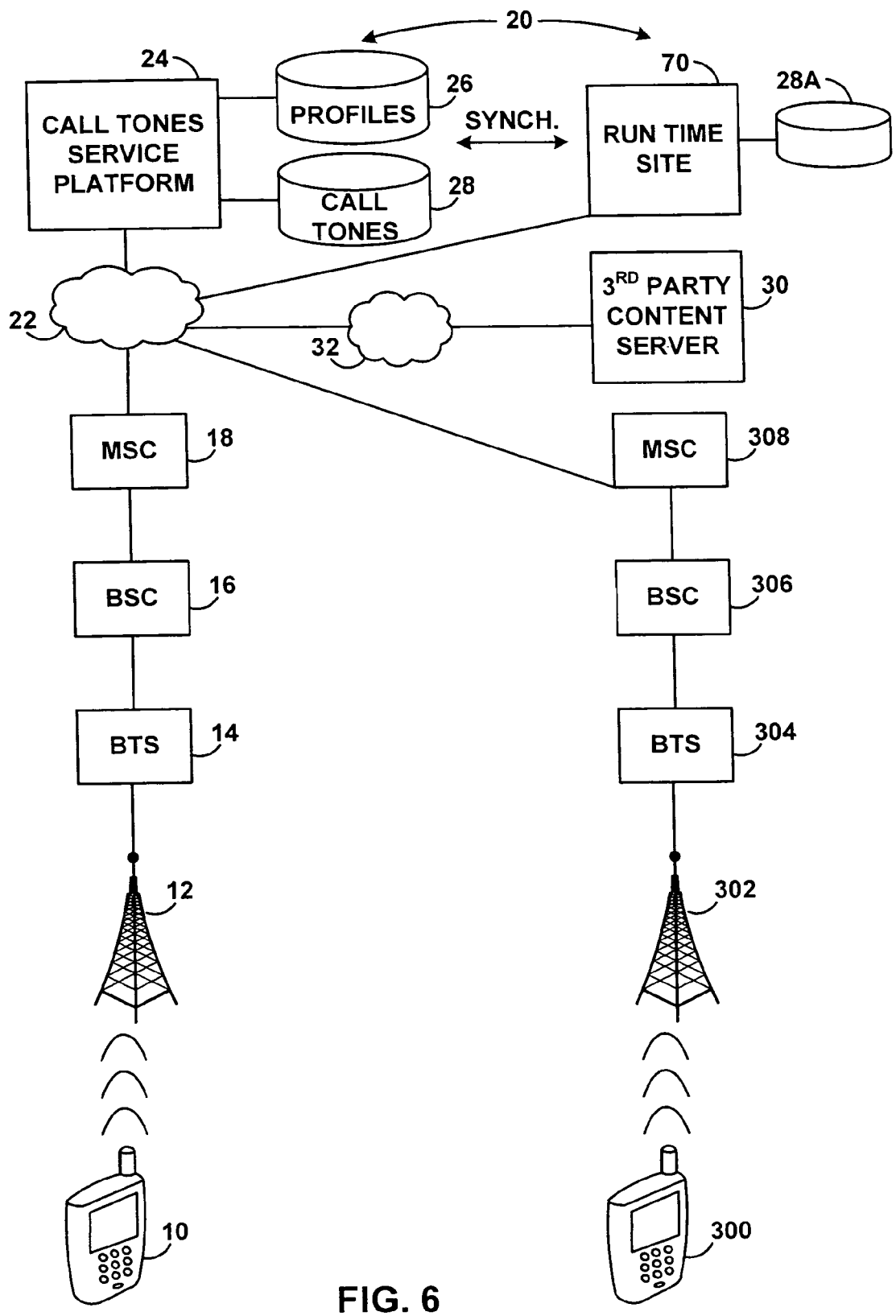
FIG. 6 is a block diagram showing the system of FIG. 1 showing a run time site which is used to play call tones content during a call.

Note that the embodiment of FIG. 5 includes a content gateway. Communications between the media service platform and the content providers 200, 202, 204 and 206 is transmitted through the content gateway 60.

The embodiment of FIG. 5 may also include a facility at the media service platform 24 which performs a screening of media content to determine whether it includes objectionable matter, as described above.

Media content is served to a calling or called party from the run time sites 70 (FIG. 6) during a call. It will be appreciated that the architecture of FIGS. 5 and 6 basically brings the media content within the network 22 of the service provider (i.e., provider of wireless telecommunication services). The service provider may have media played by its own internally configured run time sites 70 (FIG. 5) during a call. Only in the situation where the run time sites do not have the media stored locally does the service provider have to have the media played by the third party content provider.

Routing of Calls to Ringback Media Content Servers of Diverse Providers

In another aspect of this disclosure, a method is provided of routing an incoming call for a call tones subscriber to a particular ringback media content server/platform/solution for the call. The method is useful when the service provider (carrier) network supports multiple call tones solutions/service provider platforms, such as shown in FIGS. 2 and 3. The method provides a way of efficiently routing calls to particular content providers 30 to render ringback content for a diverse population of subscribers. This embodiment is particularly useful for the situation where the wireless service provider (carrier) does not implement a call tones server rendering content but rather relies on the third party content providers' call tones servers to render the content to the subscribers of the wireless service provider. In this situation, the wireless service provider provides a routing function (as explained below), and uses its switching equipment to connect callers to the call tones content provider's call tones servers.

It will also be noted again the features of FIGS. 1-5 regarding integration of the third party content providers during the process of acquiring new call tones content are considered optional and not necessary to practice of the invention.

The methods of the present invention relate to routing an incoming call to a ringback media server, e.g., content server of a provider 30 (FIG. 1) of ringback media, for example rendering of call tones in real time during a call. The method includes the steps of provisioning a service entity (e.g., service control point (SCP) of a AIN or SS7 network, see FIG. 7, SCP 326) with data which is unique to the ringback media service subscribed to by the subscriber. A mobile switching center (or other switching entity, e.g., application server in an IMS system) queries the service entity for routing instructions for ringback media to play for the caller. The service entity provides routing instructions to the mobile switching center (or other switching entity). The routing instructions identify a ringback media server to render ringback media to the caller.

In one embodiment, the routing instructions identify a call tones provider platform, e.g., one of the servers of a particular content provider 30 in FIG. 2 or 3. For example, the service entity could be provisioned with data which indicates that a particular subscriber is assigned to a particular call tones service provider 30 ("provider A"), and that all call tones for that subscriber are to be handled by the provider A platform. Other subscribers could be assigned to other providers, e.g., providers B and C.

In another possible implementation, the service entity, e.g. SCP 326, dynamically determines the routing instructions (e.g., identity of service provider platform 30) at the time of the incoming call. For example, the routing instructions could be determined based on at least one of:

a) the time of day (e.g., the content server of provider X handling calls between 10 pm and 6 am and the content server of provider Y handling calls between 6 am and 8 am, etc.), b) the day of the week (e.g., if the current day is a Sunday use provider X), c) the content of ringback media purchased by the subscriber (e.g., for certain types of content use one provider and if another type use a different provider); and d) the calling party telephone number (e.g., if the calling party is from one area code or geographic region use provider P, if another use Q or R).

When the service entity determines the correct routing information (e.g., network address, 1-800 telephone number, or other routing information, in whatever form), the service entity forwards that routing information to a switching entity (e.g., mobile switching center ((MSC)) responsible for connecting the caller to the ringback media platform for rendering media content. The MSC then sets up the call tones link for the caller to the particular call tones service platform identified by the service entity.

Thus, routing can be done via direct assignment of a subscriber to a call tones provider, or by dynamically determine of the call tones provider/platform/address based on the call tones content purchased by the subscriber. Routing could also be based on other criteria such as a call identification and the content to be played to that identification, based on the server supporting that content, or by time of day or day of the week, to provide a different call tones experience.

All call tones users would be provisioned to a service entity. The service entity could take a variety of forms, such as an SCP of a Signalling System Seven (SS7) network or a Home Subscriber Server (HSS) or Application Server in an IP Multimedia Subsystem (IMS) environment. An HSS is an analog to a home location register (HLR) in IS-41 mobile telephony.

The service entity is provided with a data that is unique to the call tones service. Such data could indicate that a subscriber has call tones and the specific call tones provider/ platform/solution to always route the caller to. Alternatively, the data could indicate that the user has call tones and which provider/platform/solution contains the content that they have purchased. Alternatively, the data could indicate that user has call tones and which provider/platform/solution(s) to route to, based on calling party number, time of day, day of the week or other parameter.

When the subscriber purchases content (for example as described above) the provisioning system automatically determines the information to provision to the network's service entities, based on, for example, the subscriber's content purchases, and the assignments of specific call tones to play to specific caller ids.

In the example where the service entity is a service control point (SCP) of an AIN or SS7 network, the call tones subscribers are provisioned with an Advanced Termination trigger in the Home Location Register (HLR) to trigger to the SCP. The logic flow might be as follows:

1. Message arrives at SCP (message sent from MSC).
2. SCP determines that called party is a call tones subscriber.
3. SCP retrieves the data provisioned for the call tones subscriber.
4. Based on the data, the SCP does a processing step to determine a routing number for the MSC to use to link the caller to a particular ringback media platform, e.g., using one or more of the criteria discussed above. For example, the routing number could potentially be based on caller ID (the phone number of the calling party), the identity of the content, the time of day, the day of the week, etc., and returns a routing number for the call to the MSC.
5. The routing number could be a toll-free number, or steering digits followed by the caller's mobile device number (MDN), or some other information that the MSC can use to translate and deliver the call to the designated call tones platform/solution.

In one possible configuration, the invention can be implemented in an IP multimedia subsystem (IMS). Instead of a SCP, the service entity takes the form of an application server. The application server is provisioned with the same information that the SCP is provisioned with in the above example. Such provisioning could be from a user profile, e.g., in a database maintained by a call tones provisioning system. At the time the call is set up, the MSC sends an inquiry message to the application server. The application server recognizes that the subscriber/called party has call tones, and then examines the user profile for the called party to determine how to route the call for providing call tones to the calling party. The application server could identify a toll-free number, or one or more Media Resource Controller/Function platforms which implement a ringback media function and transmit ringback media in IP packets to the caller. The application server returns the routing information (network address, toll free number, etc.) to the MSC responsible for setting up the call tones leg for the calling party.

Caller or Carrier Controlling of Ringback Media

In another aspect of this invention, a method is disclosed of controlling the play or rendering of ringback media content to a caller. Two different ways are contemplated for controlling content, one of which involves the caller controlling the play and another which involves the caller's carrier controlling the play.

In the example of the caller controlling play of ringback media content, the method includes the steps of establishing a connection between a ringback media server and a telephone used by the caller; transmitting ringback media to the telephone during a ringback period; receiving signals from the telephone (e.g., DTMF tones) at the ringback media server during the ringback period; and then changing the ringback media transmitted from the ringback media server to the telephone responsive to the received signals.

For example, the caller may be prompted to press certain digits on the telephone key pad in order to pause, stop, fast forward or rewind the content (it will be noted that such action is considered "changing" the ringback content because the transmission of the content is affected from what it otherwise would be if no digits were pressed). When the digits are pressed, DTMF tones are sent from the telephone to the ringback media server. The server interprets the signals and responsively pauses, stops, fast forwards, or rewinds the ringback media content. As another example, the caller could press some particular digit pattern, e.g., # 2, which would cause the ringback media server to transmit a standard ringing tone until the called party goes off-hook.

In still another aspect, an improvement to a ringback media server (310 in FIG. 7) is disclosed having a processing unit (not shown, but conventional) and a memory (not shown but conventional) storing program instructions for execution by the processing unit. The ringback media server 310 transmits ringback media to callers served by a carrier providing wireless services for the callers. The improvement comprising providing program instructions in the memory a) to process signals (e.g., DTMF tones) from telephones used by callers received at the ringback media server during a period of time in which ringback media is being transmitted by the ringback media server to the telephones, and b) to change the ringback media transmitted from the ringback media server to the telephones responsive to the received signals.

Figure 7:
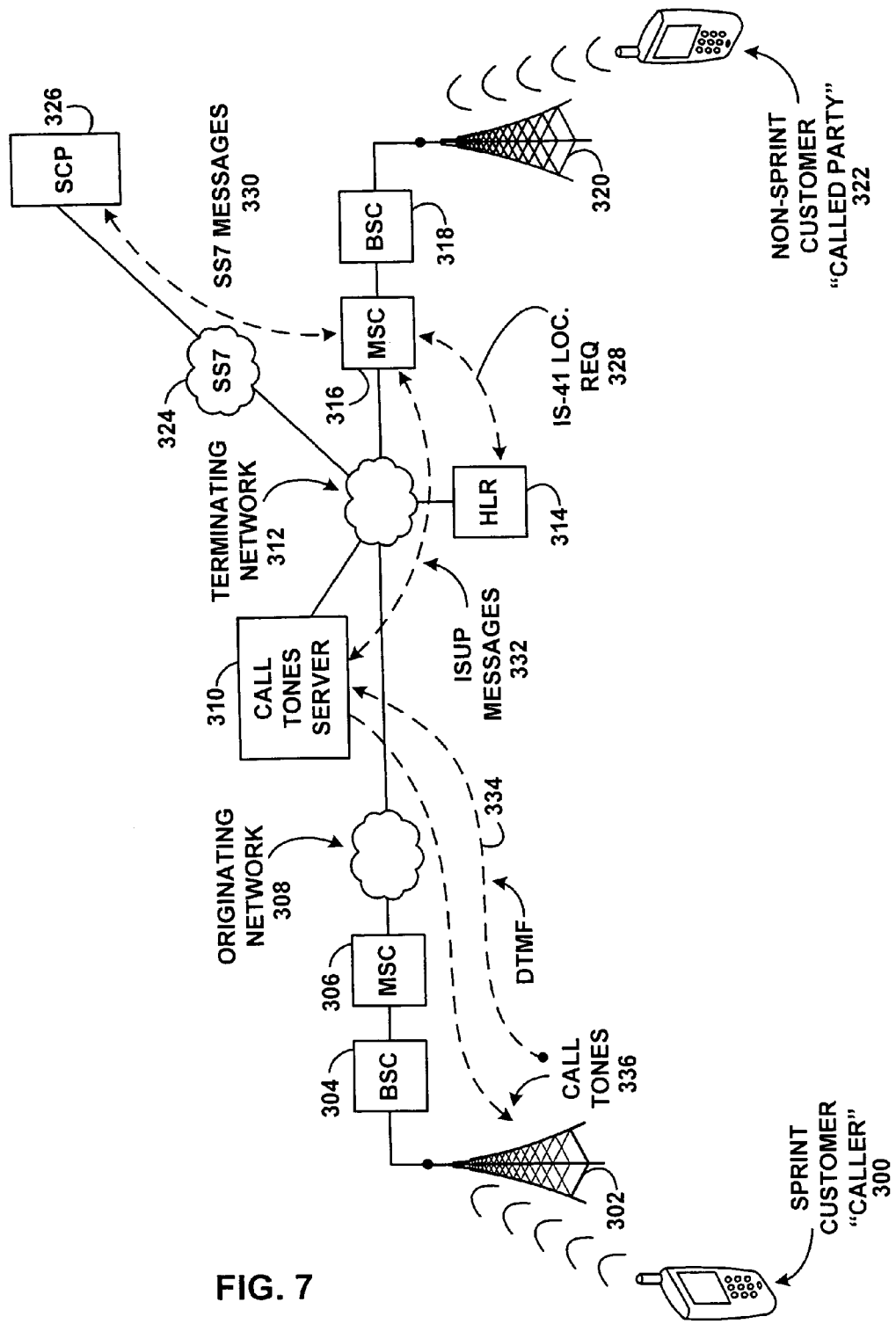
FIG. 7 is a block diagram showing the entities involved in the implementation of a method for controlling play of ringback media.

Referring now to FIG. 7, there is shown a system for allowing either the caller or the caller's carrier to exert control over the rending of ringback media content dynamically during the call. The system includes a caller 300 which is a subscriber to a particular carrier (in this example Sprint Nextel.) The caller communicates in known fashion over an air interface with a wireless service provider base station antenna 302, which is coupled to a base station controller 304 and a mobile switching center 306. The MSC 306 is coupled to a wireless service provider backbone network (originating network 308). Assume that the caller 300 calls a called party 322 which is not a Sprint Nextel subscriber. The call is routed to a terminating network 312, which is connected to a terminating MSC 316, a BSC 318, antenna 320 and the called party 322. Assume in this example that the called party 322 subscribes to a call tones service offered by its carrier. A call tones server 310 (which could be a platform in a call tones service platform 30 of FIGS. 1 and 2, or the run time site of FIG. 6) is the entity which transmits call tones to the caller 300 during the call setup, prior to the called party 322 going off-hook. The system of FIG. 7 further includes a home location register 314 (which may also be on the SS7 network 324) which maintains data on the location of mobile terminals of a carrier, e.g., location of called party 322.

The operation of FIG. 7 includes a flow of messages between select entities during call set up, including IS-41 location request messages 328, SS7 messages 330, ISUP messages 332, the transmission DTMF tones (334) from the caller 300 to the call tones server 310, and the call tones (ringback media) 336 themselves. The flow of messages and operation of the system of FIG. 7 will be explained in greater detail with reference to the flow chart of FIG. 8.

Figure 8:
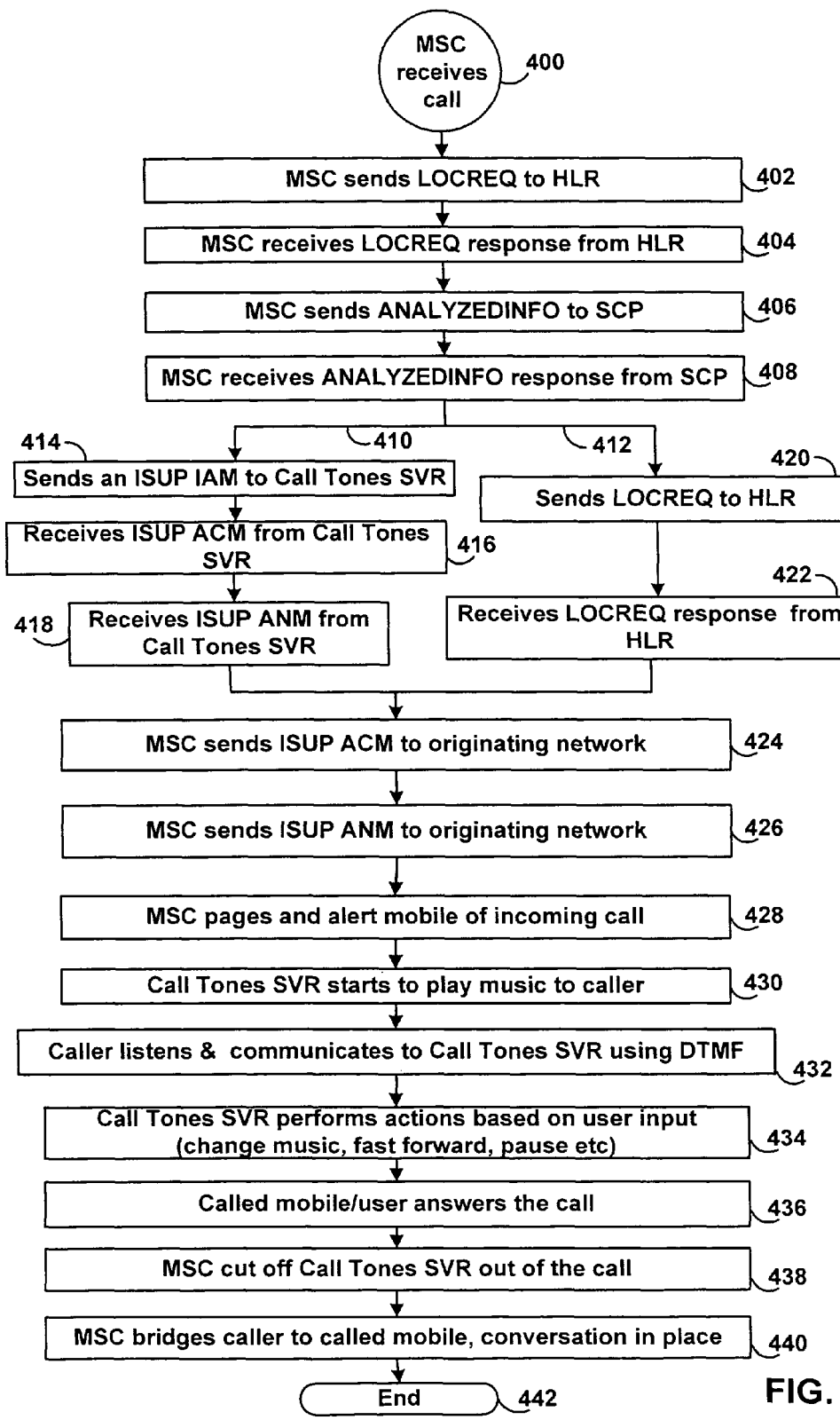
FIG. 8 is a flow chart showing a series of steps which implement a method of a caller controlling access or play of ringback media in the system of FIG. 7.

In FIG. 8, at step 400, the terminating MSC 316 (FIG. 7) receives the call from caller 300 to called party 322.

At step 402, the terminating MSC 316 sends an IS-41 location request (LOCREQ) message (328, FIG. 7) to the home location register 314.

At step 404, the MSC 316 receives a LOCREQ response from the HLR 314.

At step 406, the MSC 316 sends an ANALYZED INFO message to the SCP 326.

At step 408, the MSC 316 receives an ANALYZED INFO message response from the SCP 326. Basically, the messages 406 and 408 provide a way of alerting the MSC 316 that call tones features are supported for this call based on the identify of the called party, and cause the MSC 316 to invoke call tones processing steps. Response message 408 further identifies a particular call tones platform or server (310) to use for the call (per the previous discussion).

At this point, the MSC 318 performs two separate processing steps in parallel, represented by branch 410 and steps 414, 416 and 418, and branch 412 and steps 420 and 422.

Steps 414, 416 and 418 basically set up the call tones link between the call tones server 310 and the calling party 300. At step 410, the MSC 316 sends an ISUP IAM message to the call tones server. At step 416, the MSC 316 receives an ISUP ACM message from the call tones server 310. At step 418, the MSC receives an ISIP ANM message from the call tones server 310.

Step 420 and 422 are normal call delivery steps that are performed, regardless of whether call tones is applicable. At step 420, the MSC sends a second location request message to the HLR 314 and at step 422 receives a second response message from the HLR 314.

At step 424, the MSC sends an ISUP ACM message to the switching element (e.g., landline switch or MSC, depending on the type of call) in the originating network 308.

At step 426, the MSC sends an ISUP ANM message to the switching element in the originating network.

At step 428, the MSC 316 pages the called party 322 and alerts the mobile of the incoming call, e.g., causing the called party 322 phone to ring.

At step 430, the call tones server 310 starts to play music to the caller 300 (ringback media is transmitted from the server 310 to the phone 300) (arrow 336 in FIG. 7).

At step 432, the caller 300 has the option to control and change the rendering of the ringback media from what it otherwise would be. For example, they could chose to rewind it, fast forward it, pause it, stop it, or change to a different call tones media. To facilitate this feature, the caller 300 presses one or more buttons on the phone keypad which responsively causes DTMF tones to be transmitted from the phone via the antenna 302, BSC 304, serving MSC 306 and network 308 to the call tones server 310 (see arrow 334 in FIG. 7).

At step 434, the call tones server 310 is programmed with processing instructions which recognized the receipt of DTMF tones from calling parties (messages 334 in FIG. 7) and responsively take action according to the particular DTMF sequence that is pressed. For example, if the caller presses 0 while the call tones are in progress, the server 310 stops rendering the ringback media, if they press 1 the call tones are paused, if they press 2 the call tones media file is fast forwarded some predetermined amount, or if they press 3 and then #, the call tones server stops playing the ringback media file and instead transmits plain old ringing tones. Obviously, DTMF tones can be used to control rendering of ringback media in a variety of ways within the scope of the broad teachings of this disclosure, and the details of a particular implementation are not particularly important. For example, the system may provide for the user making a new selection of call tones by transmitting a sequence of DTMF tones, for example taking into consideration a user profile or default settings (e.g., *1 is interpreted as play the caller's favorite ringtone).

At step 436, the called party 322 goes off hook and answers the call.

At step 438, the MSC 316 cuts off the call tones server 310 from the call.

At step 440, the MSC 316 bridges the caller 300 to the called party 322 and the call continues in the usual fashion.

At step 442, the processing of call tones using the system of FIG. 7 is complete and the entities repeat the process for a new call.

In still another aspect of this disclosure, a method is provided for a carrier to control the play of ringback media to a caller which is a subscriber to a carrier. Consider the example of FIG. 7. In this aspect, the idea is that the carrier (carrier to which caller 300 subscribes) may want to limit its subscribers' exposure to ringback tones offered by competing carrier (e.g., carrier which the called party 322 subscribes to) and so the carrier may substitute its own ringback tones for that offered by the competing carrier or otherwise stop, interrupt or prevent play of ringback media of the competing carrier.

In this respect, the method comprises the steps of a) determining whether the caller 300 calls a party that (1) subscribes to a second carrier and (2) subscribes to a ringback media service with the second carrier; and b) limiting exposure of the caller to ringback media provided by the second carrier. This determining step could be performed in the SCP 326, in the MSC 316, in the call tones server 310, or elsewhere. As noted, the step b) may include the step of transmitting ringback media tones offered by the carrier to the caller 300, instead of tones which are offered by the carrier to which the called party subscribes. For example, the calling party's carrier may determine a genre, style (or more generally, "category") of ringback tones that would have been provided by the second carrier (e.g., per an identification made in the SCP 326), and then selects a ringback tone for play by the call tones server 310 which falls within the category and plays that tone for the caller. For example, if the called party's profile indicates that calling party is to hear a particular holiday theme ringtone which is not offered by the calling party 300 carrier, then the calling party carrier may require the call tones server 310 to play a different holiday theme ringtone which it does support, thereby limiting the calling party 300 exposure to ringtones of different carriers which it does not support.

As another example, call tones may be associated with a particular identification (e.g., ID number) and a look-up table consulted which correlates call tone ID numbers to genres or types. Such table could for example be maintained by the carrier, and call tone providers currently offering call tones products would provide information about their products to go into the table. The carrier first determines whether a call tone is to be played to one of its subscribers and that that it does not offer that call tone. IT then consults the table to determine the genre of the call tone. It then selects (e.g., at random), another call tone of that genre which it does support or offer, and then it directs is call tones server (or a third party call tones server) to play the call tone of that genre that it supports. Alternatively, if it determines that the caller would be exposed to a call tone that it does not offer or support, it could play a standard call in progress tone to the caller phone.

As variations, the call tones server 310 could take other action to limit exposure to the call tones of the called party carrier, such as not playing them, and instead playing default ring tones or standard ringing tones when the caller calls a called party and the called party's carrier offers ring tones which it does not support.

While presently preferred and alternative embodiments have been described, variation from the illustrated embodiments is possible without departure from the scope of the invention. The scope is to be determined by reference to the appended claims.

We claim:

1. A method of a controlling play of ringback media to a caller which subscribes to a first carrier, comprising the steps of:
   a) in a ringback media server operated by the first carrier, determining whether the caller calls a party that (1) subscribes to a second carrier and (2) subscribes to a ringback media service with the second carrier; and
   b) the ringback media server limiting exposure of the caller to ringback media provided by the second carrier.

2. A method of a controlling play of ringback media to a caller which subscribes to a first carrier, comprising the steps of:
   a) determining whether the caller calls a party that (1) subscribes to a second carrier and (2) subscribes to a ringback media service with the second carrier; and
   b) limiting exposure of the caller to ringback media provided by the second carrier;
   wherein step b) comprises the step of transmitting ringback media tones offered by the first carrier to the caller.

3. A method of a controlling play of ringback media to a caller which subscribes to a first carrier, comprising the steps of:
   a) determining whether the caller calls a party that (1) subscribes to a second carrier and (2) subscribes to a ringback media service with the second carrier; and
   b) limiting exposure of the caller to ringback media provided by the second carrier;
   wherein step b) comprises the step of preventing play of ringback media offered by the second carrier.

4. A method of a controlling play of ringback media to a caller which subscribes to a first carrier, comprising the steps of:
   a) determining whether the caller calls a party that (1) subscribes to a second carrier and (2) subscribes to a ringback media service with the second carrier; and
   b) limiting exposure of the caller to ringback media provided by the second carrier;
   wherein the step b) comprises the step of determining a category of the ringback media provided by the second carrier intended for play to the caller, and providing a ringback tone to the caller which is offered by the first carrier in the same category as the determined category.

5. In a ringback media server having a processing unit and a memory storing program instructions for execution by the processing unit, the ringback media server transmitting ringback media to callers served by a carrier providing wireless services for said callers, the improvement comprising:
   providing program instructions in the memory a) to process signals from telephones used by said caller received at the ringback media server during a period of time in which ringback media is being transmitted by the ringback media server to the telephones, and b) change the ringback media transmitted from the ringback media server to the telephones responsive to the received signals;
   wherein the memory is further programmed with instructions for c) determining whether the caller calls a party that (1) subscribes to a second carrier and (2) subscribes to a ringback media service with the second carrier, and if so responsively limits exposure of the caller to ringback media provided by the second carrier.

6. The improvement of claim 5, wherein, in response to a positive determination in step c), the ringback media server provides ringback tones offered by the carrier to subscribers to the caller, either directly or by means of a ringback media content provider interoperating with the carrier.

7. The improvement of claim 5, wherein in response to a positive determination in step c), the ringback media server prevents play of ringback tones provided by the second carrier.

8. The improvement of claim 5, wherein in response to a positive determination in step c), the ringback media server determines a category of ringback tones provided by the second carrier intended for play to the caller, and provides a ringback tone to the caller which is offered by the carrier in the same category as the determined category.

9. A method of routing an incoming call for a ringback media subscriber to a ringback media server, comprising the steps of:
   provisioning a service entity with data unique to ringback media service subscribed to by the subscriber;
   responsive to an incoming call for the subscriber, querying the service entity for routing instructions for ringback media to play for the incoming call;
   the service entity providing routing instructions to a mobile switching center, the routing instructions identifying a ringback media server to render ringback media to the caller of said incoming call.

10. The method of claim 9, wherein the routing instructions identify a call tones provider platform.

11. The method of claim 9, wherein the service entity dynamically determines the routing instructions at the time of the incoming call.

12. The method of claim 11, wherein the routing instructions are determined based on at least one of a) the time of day, b) the day of the week, c) the content of ringback media purchased by the subscriber; and d) the calling party telephone number.

13. The method of claim 9, wherein the services entity comprises a service control point of an advanced intelligent network.

14. The method of claim 9, wherein the service entity comprises an application server, and wherein the application server is provisioned with the data from a user profile.

* * * * *